J. C. SOEMER.
INTERNAL COMBUSTION ENGINE.
APPLICATION FILED APR. 1, 1918.

1,306,639.

Patented June 10, 1919.
9 SHEETS—SHEET 5.

Inventor
J. C. Soemer
By
Attorney

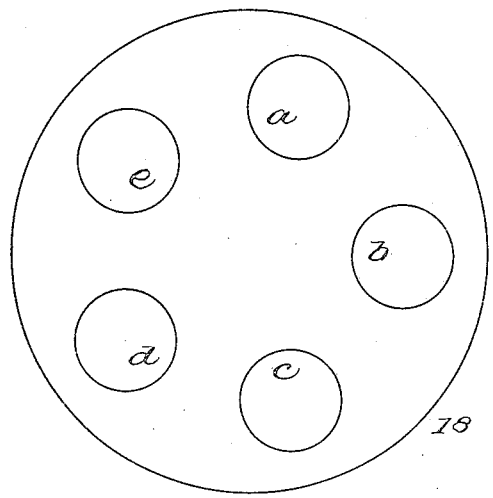
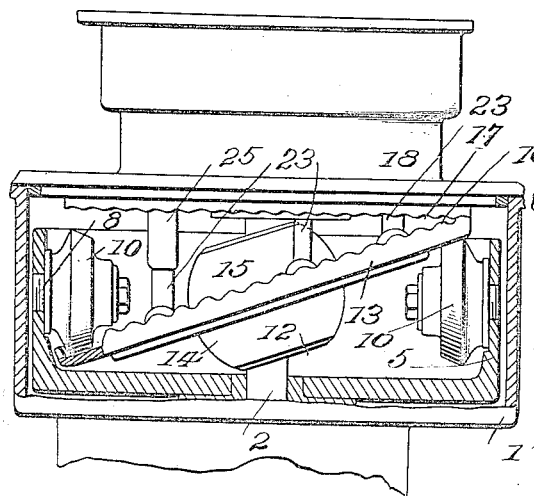
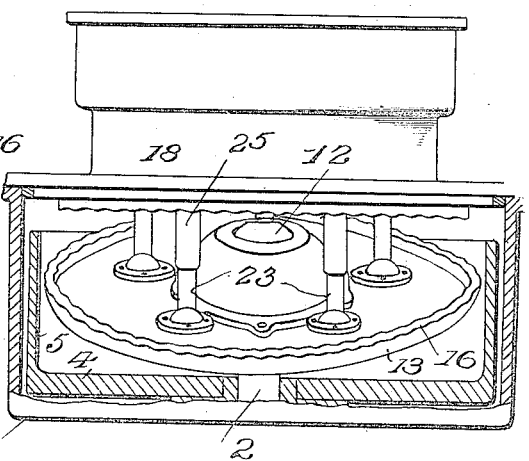

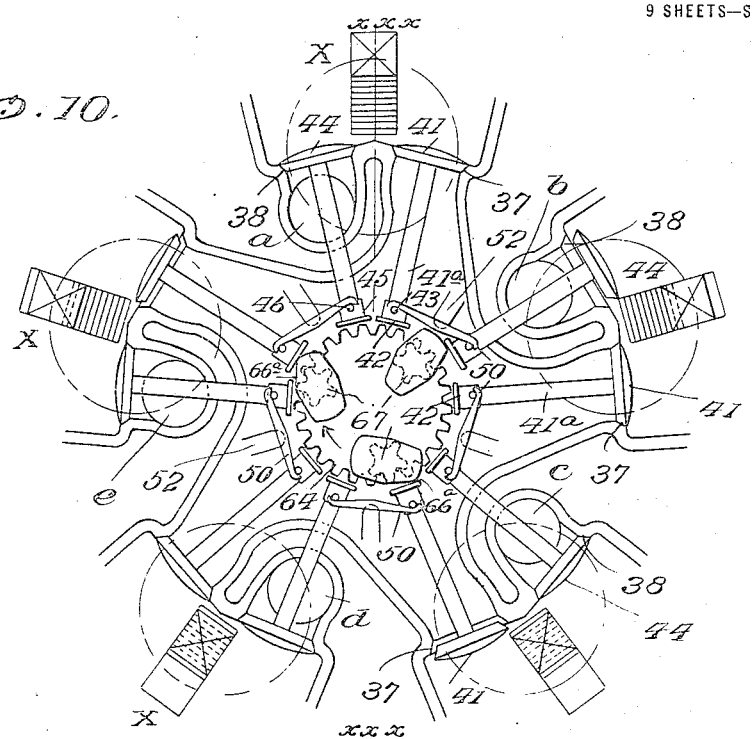

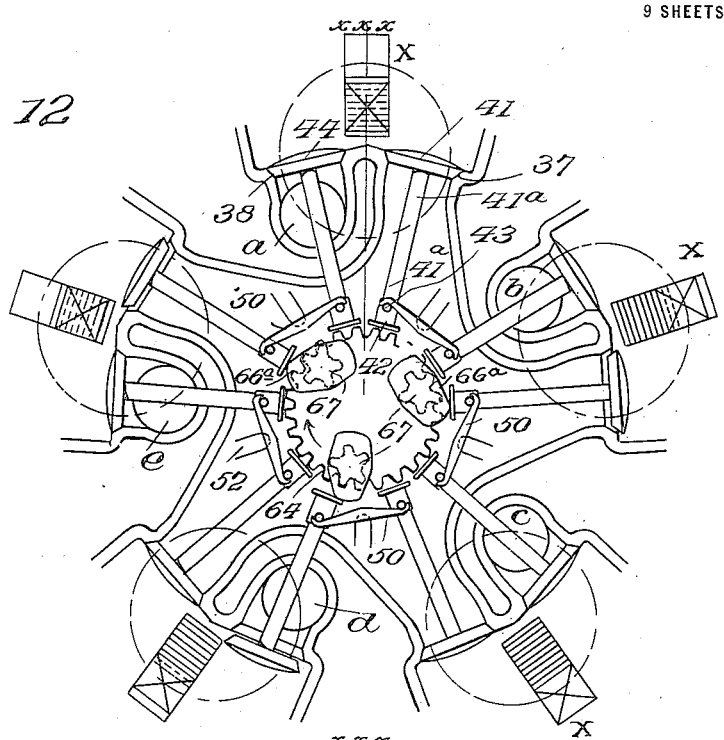

J. C. SOEMER.
INTERNAL COMBUSTION ENGINE.
APPLICATION FILED APR. 1, 1918.

1,306,639.

Patented June 10, 1919.
9 SHEETS—SHEET 9.

Inventor
J. C. Soemer
By
Attorney

UNITED STATES PATENT OFFICE.

JOSEPH C. SOEMER, OF NEWARK, NEW JERSEY.

INTERNAL-COMBUSTION ENGINE.

1,306,639.  Specification of Letters Patent.  Patented June 10, 1919.

Application filed April 1, 1918. Serial No. 226,073.

*To all whom it may concern:*

Be it known that I, JOSEPH C. SOEMER, a citizen of the United States of America, residing at Newark, in the county of Essex and State of New Jersey, have invented certain new and useful Improvements in Internal-Combustion Engines, of which the following is a specification.

My invention relates primarily to an internal combustion engine, wherein reciprocating motion from pistons is transmitted to a rotary shaft by an interposed wabble disk, held in position to travel in a predetermined path.

The prime object of the invention is to provide an engine of such construction as to permit of the employement of as many pistons as may be found convenient to obtain the necessary explosive impulses in one cycle of operation as will equally distribute the forces to the wabble disk.

A further object of this invention is to provide new and improved means for actuating the valves, to insure of the timing of the exhaust and inlet of the gases.

The invention also comprehends improvements in the details of construction and arrangement of parts which will be hereinafter described and particularly pointed out in the claims.

In the accompanying drawings:—

Fig. 7 is a diagram to illustrate the lay out of the pistons.

Figs. 8 and 9 are diagrammatic views to illustrate the positions and the operation of the various pistons, and the disk.

Figs. 10 to 15 represent diagrammatically the positions of the valves and pistons in two complete revolutions of the main shaft, or in one complete explosive cycle.

Figure 1:
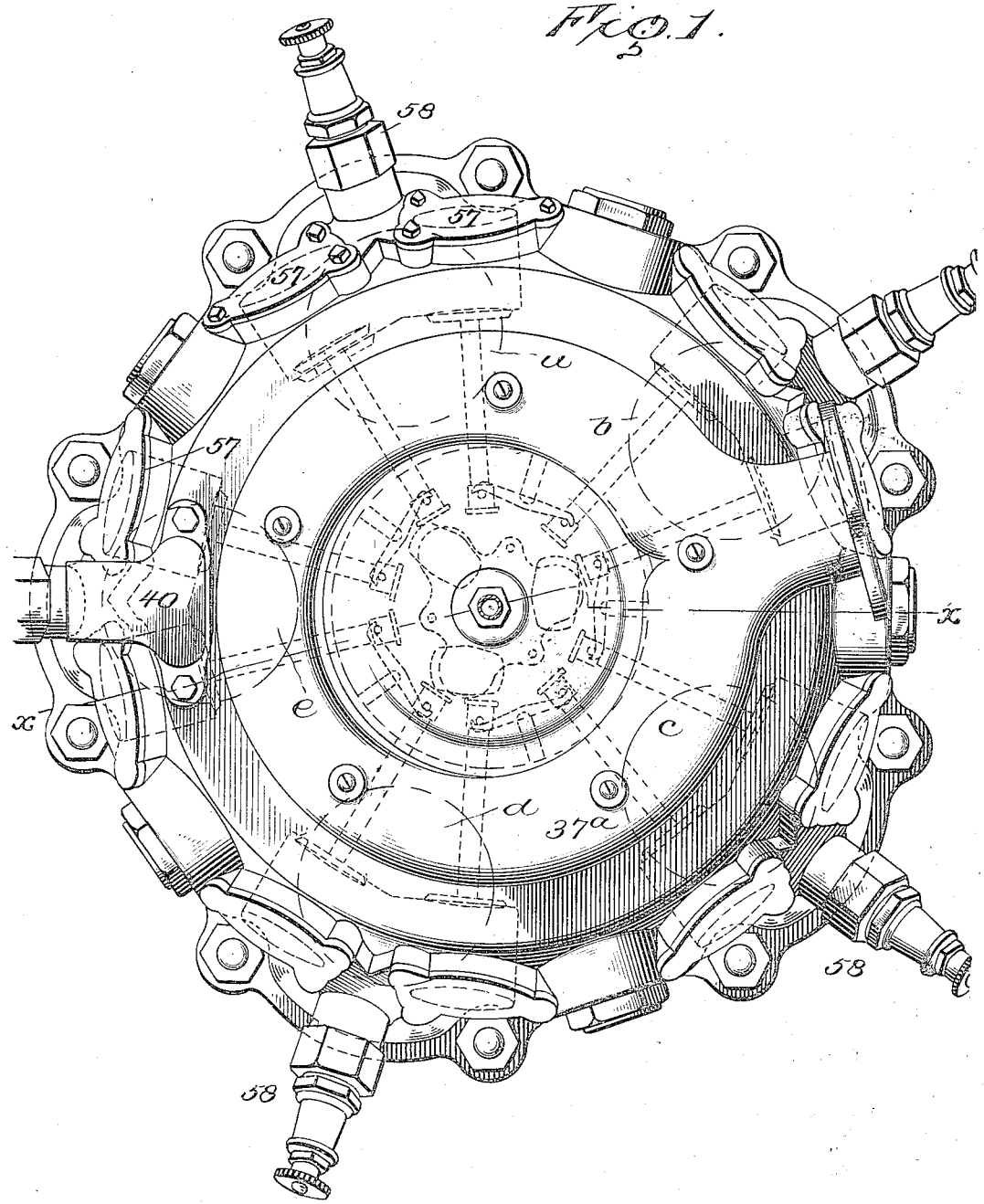
Figure 1 is a plan view of my improved engine.

In illustrating my invention I have disclosed five cylinders, but it is to be understood as many more or less may be employed if desired, five being however preferable to four or less to avoid the possibility of the engine stalling on dead center.

1 indicates a lower casing, in which is mounted a vertical shaft which extends entirely through the engine. On the lower portion of the shaft 2, is keyed a beveled gear wheel 3, having a horizontal flange, to which is bolted a hollow fly wheel 4, formed with an annular flange 5. Of course any other form of gearing may be employed, such for instance as worm or helical gears. In diametrically disposed threaded openings 6, in the flange 5, are plugs 7, which receive inwardly extending bolts 8. On the bolts 8, between the plugs 7, and flanged nuts, are bushings 9, and mounted thereon, are beveled rollers 10, rotatable on roller bearings 11.

On the shaft 2, above the beveled pinion 3, is keyed or otherwise secured a hollow ball bearing 12, and supported thereon is a wabble disk 13. The center of the disk is provided with a depending semi-spherical socket 14, in which the lower portion of the ball bearing fits, and bolted to the upper surface of the disk is a cap plate formed with an upwardly extended semi-spherical depression 15, which engages the upper position of the ball bearing, the two semi-spherical portions embracing the ball and forming thereby a central support for the disk. The disk is at all times held in inclined position, one of the beveled rollers 10 engaging the top of the disk near the edge thereof, while the under side of the opposite edge of the disk is supported by the other roller 10. The edge of the disk is formed with beveled teeth 16, which engage an annular row of similar teeth 17, on the bottom of the cylinder block 18.

The intermeshing teeth are for the purpose of forming an interlock between the disk and the block, to prevent rotation of the disk in the operation of the engine, while the oppositely disposed beveled rollers hold the teeth in mesh, and afford a means for permitting of the pistons imparting the proper leverage to the disk to effect the necessary rotation of the fly wheel, as will presently appear.

Figure 2:
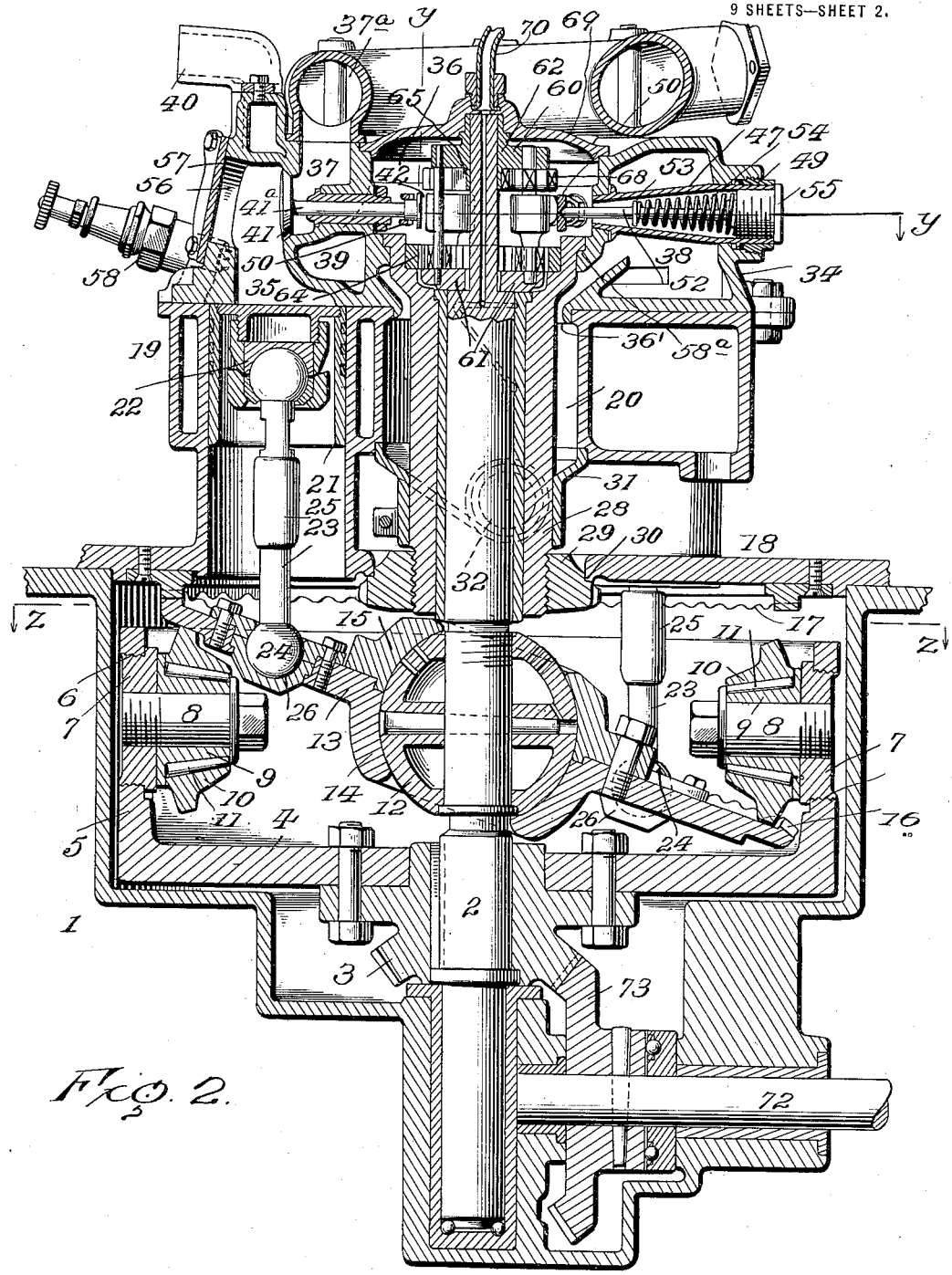
Fig. 2 is a vertical section of same substantially on the line $x$—$x$ of Fig. 1.
Figure 3:
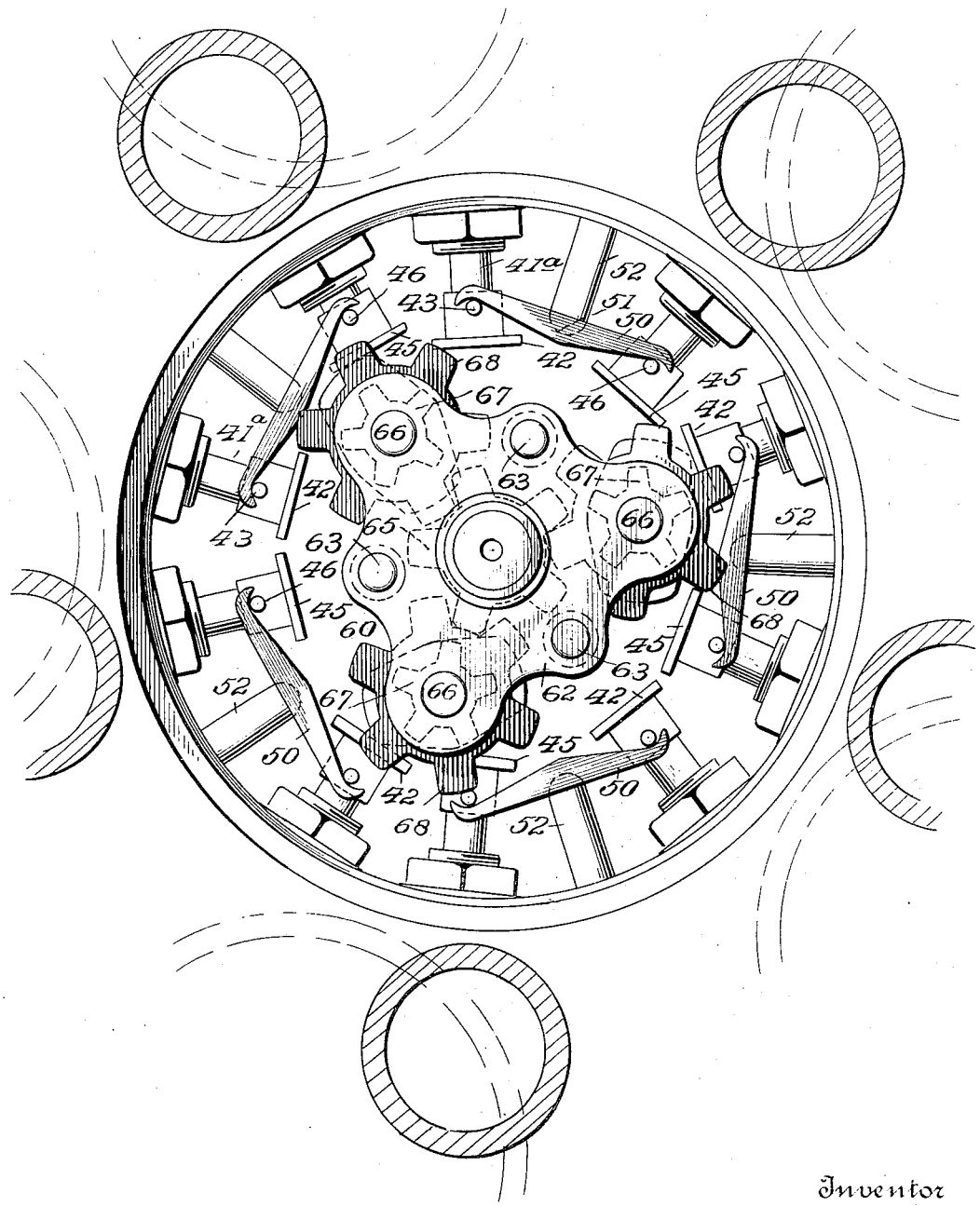
Fig. 3 is an enlarged plan view of the valve operating mechanism.

The cylinder block 18, is mounted on top of the casing 1, and is provided with five cylinders *a—b—c—d—*and—*e*, and surrounding part of the latter is a water jacket 19. The center of the cylinder block is formed with an annular opening 20, formed by the inner wall of the water jacket, as shown in Fig. 2. Operating in each cylinder is a piston 21, having an internal socket 22, in which fits a ball bearing on the end of a piston rod 23. The lower end of the piston rod is formed with a ball bearing 24, and the rod is preferably formed in sections, connected by a sleeve 25, for the purpose of assembling as the ball ends are larger than the opening in the ball bearing. The lower ball bearing fits in a socket 26, formed in a plate seated in an opening in the disk. It will of course be understood that all the pistons are similarly connected to the disk, although but one has been specifically described.

The shaft 2 extends centrally through the cylinder block 18, and surrounding same is a sleeve 28, the lower end of the sleeve being threaded to be engaged by a nut 29 to hold it in position, the edges of the nut engaging a flange 30, to tightly secure the sleeve in position on the cylinder block. On the sleeve 28 is clamped a cup shape collar 31, the upper end of which registers with the central opening or passage 20, while the bottom of the collar terminates in a tubular extension 32, and serves as an intake pipe for the gaseous mixture.

On the top of the cylinder block is bolted a top casting 34, formed with five combustion chambers 35, and a central well 36, the overflow from which lubricates all the working parts. Extending from each combustion chamber 35, is an exhaust port 37, which communicates with an exhaust manifold 37ª located on top of the casting 34. Also communicating with each combustion chamber 35, is an intake port 38, which extends downwardly and communicates with the opening or passage 20, in the cylinder block by means of a passage 36'. Surrounding the exhaust and inlet ports is a water jacket 39, which communicates through appropriate channels with the water jacket in the cylinder block, the water after circulating through the jacket passes off through a pipe 40.

In each combustion chamber is an exhaust valve 44, fitting in the end of the exhaust port 37, the stem 41ª, of the valve extending into the well 36, where it is provided with a headed collar 42, and through same passes a vertical pin 43. Fitting in the end of the intake port is an inlet valve 41, the stem of same extending inwardly to the well 36, and is provided with a headed collar 45, having a vertical pin 46. The inlet and exhaust valves are disposed radially around the casting 34, to properly position their inner ends to be engaged by the actuating and timing mechanism.

Figure 4:
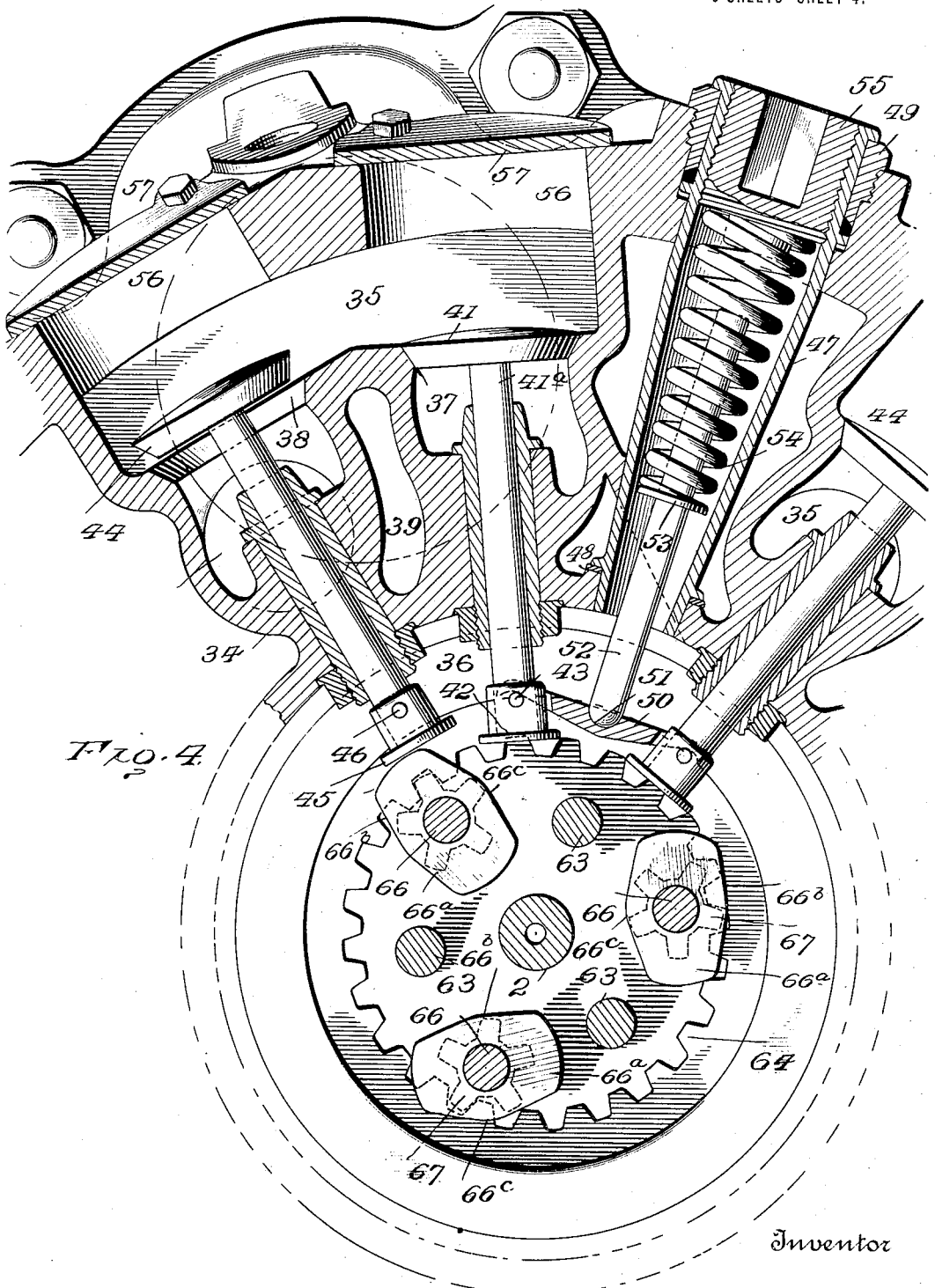
Fig. 4 is a detail horizontal section on the line $y$—$y$ of Fig. 2.
Figure 5:
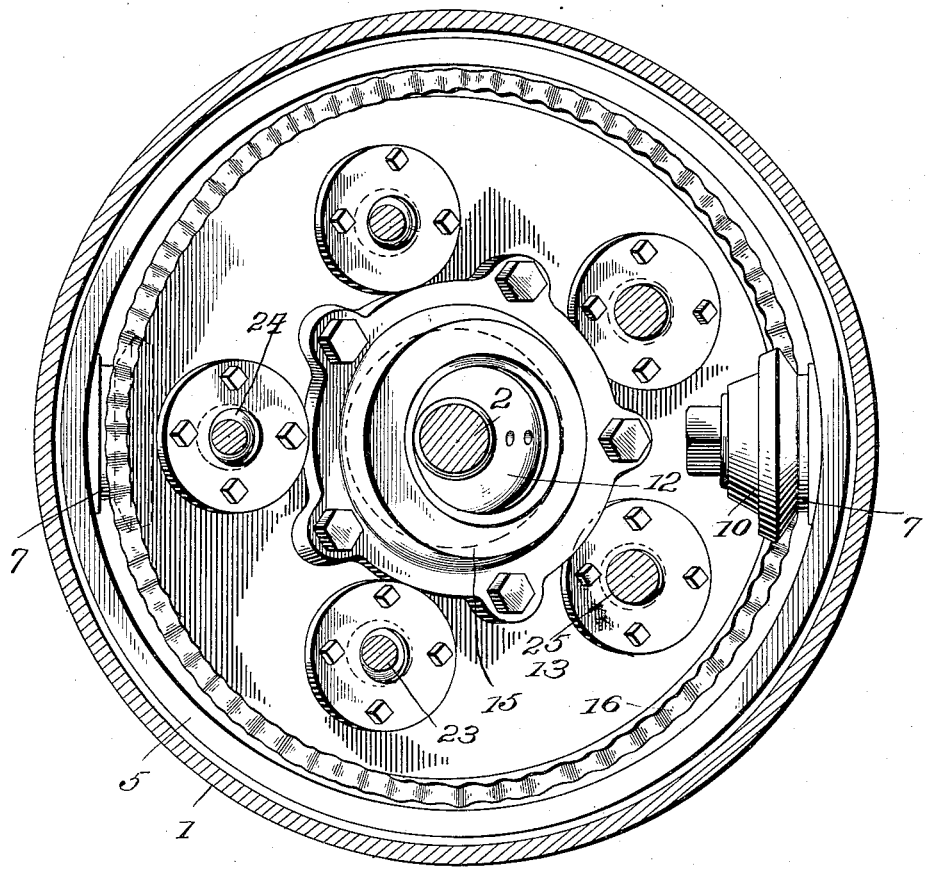
Fig. 5 is a detail horizontal section on the line $z$—$z$ of Fig. 2.

Radially disposed between the exhaust valve of one cylinder, and the inlet valve of the adjacent cylinder, is a tapered housing 47, which extends through the casting 34. Each housing is provided at its inner end with a flange which engages a seat 48 (see Fig. 4), while a lock nut and packing gland 49, at the outer end serve as a means for fastening the bushing in position.

50 indicates a double yoke the opposite ends of which straddle the adjacent collars 42 and 45, on the inlet and exhaust valve stems, the outer central surface of the yoke having a seat 51, engaged by the rounded end of a rod 52, extended into the tapered housing 47. The rod is provided with a flange 53, against which a coiled spring 54 bears, the outer end of the spring engaging a plug 55, threaded in the outer end of the tapered housing.

The action of the spring, rod and yoke, is to normally close the inlet and exhaust on their seats, and at the same time this construction serves as a means, by which either the exhaust or the inlet valve can be opened, as will appear later on.

Access may be had to each combustion chamber 35, and the valves therein through openings 56, normally covered by plugs 57, and extending into each combustion chamber is a spark plug 58. The plugs of course will be suitably connected with appropriate means for sparking at the proper time.

In the lower portion of the well 36, is an annular flange 58ª, on which the upper flanged end of the sleeve 28, is supported. By this construction it will be seen that when the nut 29, is tightened it will draw the sleeve between the casting 34, and the cylinder block to lock the parts together.

The upper end of the shaft 2 is reduced and extends up through the well 36, and has mounted thereon a cage 60, comprising a lower spider 61, seated in a recess formed in the upper end of the sleeve 28, an upper spider 62, and connecting standards 63. Supported in the upper end of the sleeve 28, is a fixed internal toothed gear 64, having twenty-five teeth, while mounted on the upper reduced end of the shaft, below the top of the cage, is a gear wheel 65, having five teeth. Mounted in the spiders of the cage are three vertical shafts 66, and on the lower end of each is a pinion 67 having five teeth which meshes with the twenty-five teeth of the fixed internal gear wheel 64, while on the upper end of each of said shafts is a gear wheel 68, having six teeth, meshing with the gear wheel 65, on the shaft.

On each shaft 66, is a cam 66ª, the cams rotating in the path of the faces of the flanged collars 42 and 45, to operate the inlet and exhaust valves 41 and 44. The cams are elongated blocks, rounded on their ends to engage the flanged collars, and are comparatively flat on one side 66$^b$, and are bulged on the other side 66$^c$, this shape being found preferable to obtain the proper timing in opening and closing the valves.

A cap plate 69, is placed over the well to prevent entrance of foreign matter to the working parts, and the center of same is connected with an oil supply, which communicates with an oil duct 70, for lubricating the parts. The working parts of the valve actuating mechanism, including the springs and rods operate in a bath of oil, the construction being so arranged to accommodate the oil.

Mounted in suitable bearings below the casing 1, is a power shaft 72, on the inner end of which is a beveled pinion 73, which meshes with the beveled pinion 3, on the shaft 2, but as previously stated, other means may be employed.

Figure 6:
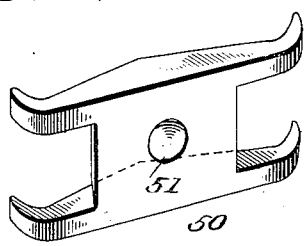
Fig. 6 is a detail view of a part of the valve actuating mechanism.

In the operation, referring particularly to Figs. 6, 7 and 8, assume that the piston in cylinder $b$ is at the limit of the upward stroke, or upper dead center the charge having been compressed and is ready to be exploded.

The movement of the disk in direction of cylinder $c$, elevates the piston therein, and because of the position of the friction rollers 10, the disk is caused to tilt.

Referring to Figs. 10 to 15, which represent diagrammatically, the positions of and the timing of the various valves, and pistons. The positions of the pistons being shown adjacent each cylinder, as indicated at X, the length of the stroke of the pistons being divided into ten equal parts to show the relative locations of said pistons to the valves and cams, the arrows indicating the direction of movement.

In Fig. 10, the piston X, in cylinder $a$, is at the top dead center ready for the explosion, both inlet and exhaust valves 41—44 being closed, the end of the approaching cam 66$^a$ now being at such a distance from the valve heads, that both valves will remain closed until the downward stroke of the piston is nearly completed, when the exhaust valve 44 in cylinder $a$, will begin to open. The exhaust valve 44 in cylinder $b$, is now wide open, but its cam will soon permit said valve to close as the piston X has traveled about eight tenths of its upward or exhaust stroke.

Shortly after piston X of cylinder $b$, passes its upper dead center, the cam will have moved to a point where it will open inlet valve 41 for the suction stroke of the piston.

Inlet valve 41 in cylinder $c$ is shown as closing and the piston X one tenth of its stroke from the bottom on its upper or compression stroke, the explosion taking place in this cylinder ($c$) after the explosion in cylinder $a$, the one tenth of a stroke being equivalent to the distance that the cylinder $c$ is removed from the center line opposite cylinder $a$, or one tenth of the circle.

The piston in cylinder $d$, is now one tenth of its stroke from the bottom of the cylinder, the piston completing its explosive stroke. It will be noted that the approaching cam 66$^a$ will commence to open the exhaust valve 44 before the piston X in cylinder $d$ reaches the bottom of the latter. This piston still has one tenth of its stroke to move, or equal to about 36 degrees of the cycle of movement, whereas the advance of less than one tooth of the internal gear wheel 64, or approximately one twenty-fifth of the cycle of movement when the exhaust valve will open. The time taken for the opposite end of the cam to reach the inlet valve being approximately equal to the upward or exhaust stroke.

Explosion in cylinder $e$, follows the explosion in cylinder $c$, and like cylinder $b$, is one fifth of a cycle or seventy two degrees removed from the line $x$—$x$, and is therefore one fifth of its stroke from the end of the cylinder on the downward or intake stroke. The cam 66$^a$ being in position just after the opening of the inlet valve.

From the foregoing description it will be seen that the piston in cylinder $a$ is in position to start downwardly on its explosion stroke; piston in cylinder $b$ is in position when just about completing its exhaust stroke; and the piston in cylinder $c$ is in position where it is beginning its compression stroke.

The next explosion will occur in cylinder $c$, the wabble disk having moved the piston to compress the charge, and reference is now made specifically to Fig. 12. From this figure it will be seen that the piston in cylinder $c$ is in exactly the same position as the piston $a$ in Fig. 10. Then the positions of the pistons in cylinders $c$, $d$, $e$, $a$ and $b$ in Fig. 12 will correspond with the positions of the pistons in cylinders $a$, $b$, $c$, $d$ and $e$ in Fig. 10, the wabble disk being so timed as to move the parts to produce this result. As stated, the charge in cylinder $c$ is now ready to explode, hence the piston will be driven downwardly, and through the connections the shaft is rotated and the pistons are moved to the position shown in Fig. 14. This figure shows the position of the pistons when the next or third explosion takes place. That is the piston in cylinder $e$ has compressed the charge and is ready to be driven downwardly by the explosion.

Figure 14:
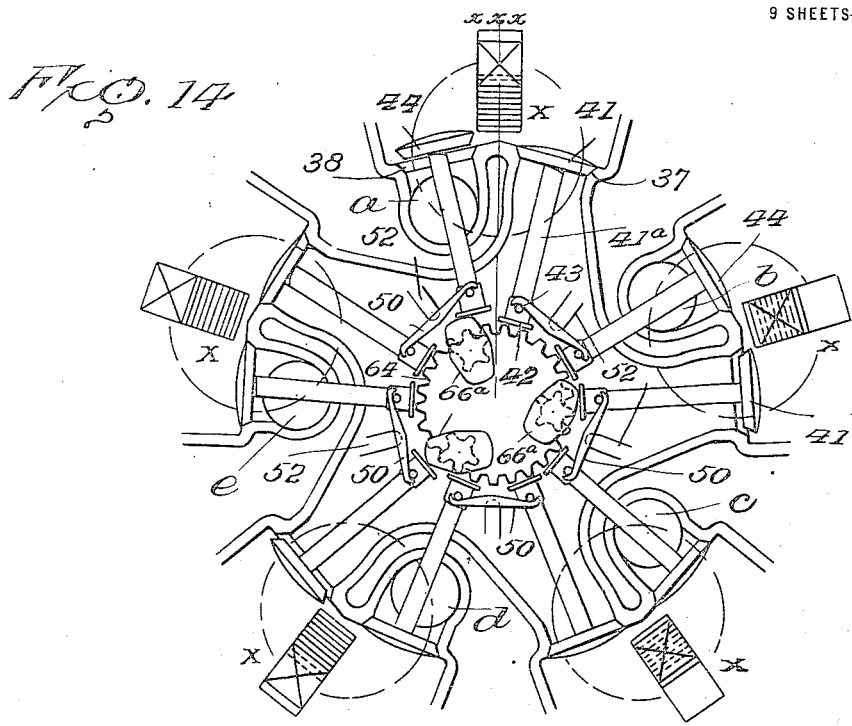
Figure 15:
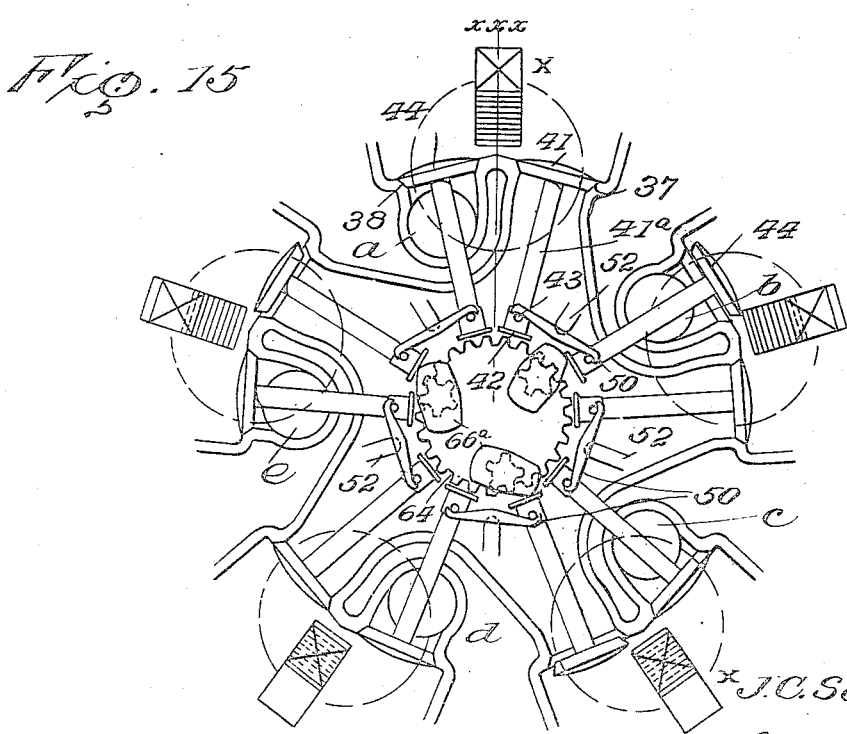

In Fig. 14, the position of pistons in cylinders $e$, $a$, $b$, $c$ and $d$, correspond respectively to the positions of the pistons in cylinders, $a$, $b$, $c$, $d$ and $e$, in Fig. 10.

Upon further rotation of the shaft, the pistons are moved in the respective cylinders, until the positions shown in Fig. 11, are reached. After the explosion takes place in cylinder e, as stated with reference to Fig. 14, the next explosion takes place in cylinder b, the parts then being in the position shown in Fig. 11. The pistons in cylinders b, c, d, e and a, in this figure corresponding to the position of the pistons in cylinders a, b, c, d and e, respectively shown in Fig. 10. The next successive explosion occurring in cylinder d, as shown in Fig. 13, the other pistons being correspondingly positioned by the wabble disk. The next successive explosion takes place in cylinder a, as explained with reference to Fig. 10.

It will thus be seen that in a five cylinder engine a charge is exploded in alternate cylinders, and that in two complete revolutions of the shaft each cylinder has exploded once, and another cylinder has taken a charge and the piston has compressed it and the parts are again in position to start another cycle of movement.

It will be observed that the rollers 10—10, acting on the wabble disk retain the pistons, valves, etc., working parts in their relative working positions when the engine is running by momentum.

Stress is placed on the construction forming the central intake for the gas. This arrangement obviates the usual manifold construction employed in gas engines. The structure shown and described will permit of the use of kerosene or other low grade fuel, which of course is of commercial importance.

What I claim is:—

1. In an engine of the class described, the combination of a plurality of cylinders, a shaft, pistons in the cylinders, connections between the shaft and the pistons, inlet and exhaust valves for each cylinder, means connecting the exhaust valve of one cylinder and the inlet valve of the adjacent cylinder, valve actuating means on the shaft for opening the valves, and means for closing the valves.

2. In an engine of the class described, the combination of a plurality of cylinders, a shaft, pistons in the cylinders, connections between the shaft and the pistons, inlet and exhaust valves for each cylinder, means connecting the exhaust valve of one cylinder and the inlet valve of the adjacent cylinder, valve actuating means on the shaft for opening the valves including a plurality of cams rotatable with the shaft, means for closing the valves, and means for individually rotating the cams.

3. In an engine of the class described a shaft, a plurality of cylinders surrounding the shaft, pistons operating within the cylinders, inlet and exhaust valves for each cylinder having radial valve stems, a yoke pivoted between its ends and arranged to engage with the stem of the exhaust valve of one cylinder and the stem of the inlet valve of the adjacent cylinder with the stems projecting inwardly beyond the yoke, a cam adapted to engage the inner end of one stem engaging the yoke so that the stem is moved outwardly and the yoke turned upon its pivot to move the other stem engaging the same inwardly, and means driven by the shaft to operate the cam.

4. In an engine of the class described, the combination of a plurality of cylinders, a plurality of pistons in the cylinders, a shaft, connections between the pistons and the shaft, an inlet and an outlet valve in each cylinder, a cage rotatable with the shaft, a plurality of cams mounted in the cage, a fixed gear, a pinion rotatable with each cam and engaging the fixed gear, a pinion fixed on the shaft, other pinions rotatable with the cams and engaging the pinion on the shaft, the cams being positioned adjacent the valves as the cage is rotated and the pinions rotating the cams to operate a predetermined valve.

5. In an engine of the class described, a shaft, a plurality of cylinders surrounding the shaft, pistons operating within the cylinders, inlet and outlet valves for the cylinders having stems arranged radially with relation to the shaft and extending toward the same, yokes arranged around the shaft and serving to connect the inlet valve stem of each cylinder with the outlet valve stem of the adjacent cylinder, yielding means to pivotally support each yoke at a point between its ends so that the yoke will move its valve stems in opposite directions, cams to act upon the valve stems in proper order, and means driven by the shaft to operate the cams.

6. In an engine of the class described, the combination of a cylinder block formed with a central opening and a plurality of cylinders, pistons in the cylinders, a shaft extending through the central opening, connections between the shaft and the pistons, a sleeve in the central opening through which the shaft passes, a casting fitted on top of the cylinder block and provided with inlet and outlet ports communicating with the respective cylinders, inlet and outlet valves in the inlet and outlet ports, a hollow casting in the central opening in the block surrounding the sleeve and formed at its lower end with a gas inlet opening and its upper end being open and in common communication with all the inlet ports, a well formed in the center of the top casting, and valve actuating mechanism rotatable with the shaft and operating in the well.

7. In an engine of the class described, the combination of a plurality of cylinders, pistons in the cylinders, a shaft, connections between the shaft and the pistons, horizontally disposed inlet and exhaust valves in each cylinder, a fixed gear ring surrounding the upper end of the shaft, a gear on the upper end of the shaft, a cage rotatably mounted on the upper end of the shaft, shafts mounted in the cage, cams on the latter shafts to actuate the valves, pinions on the upper and lower ends of the last mentioned shafts, the upper pinions engaging the upper gear wheel on the main shaft and the lower pinions meshing with the teeth on the fixed gear ring, the cams being timed and positioned to successively actuate the inlet valves of alternate cylinders.

8. In an engine of the class described, a shaft, a plurality of cylinders surrounding the shaft, pistons operating within the cylinders, inlet and exhaust valves for the cylinders having stems arranged radially with relation to the shaft and extending inwardly toward the same, radial tubular housings arranged between the inlet valve stem of one cylinder and the outlet valve stem of the other cylinder, a compressible coil spring arranged within the tubular housing, a pivot element engaging the compressible coil spring and adapted to move longitudinally of the tubular housing, a yoke engaging between its ends with each pivot element and engaging the inlet valve stem of one cylinder and the outlet valve stem of the adjacent cylinder, a plurality of cams surrounding the shaft and adapted to engage with the valve stems, and means to cause the cams to revolve around the shaft and turn upon their axes.

In testimony whereof I affix my signature in the presence of two witnesses.

JOSEPH C. SOEMER.

Witnesses:
GEORGE B. HULL,
JOHN HAMLIN.